US008551379B2

(12) United States Patent
Simons

(10) Patent No.: US 8,551,379 B2
(45) Date of Patent: Oct. 8, 2013

(54) METHOD AND SYSTEM OF MAKING DIGITAL IMAGE TRANSFER THERMOFORMED OBJECTS

(75) Inventor: Lyle S. Simons, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1778 days.

(21) Appl. No.: 11/860,787

(22) Filed: Sep. 25, 2007

(65) Prior Publication Data

US 2009/0080032 A1    Mar. 26, 2009

(51) Int. Cl.
*B29C 33/38*    (2006.01)

(52) U.S. Cl.
USPC .......... 264/222; 264/40.1; 264/132; 264/322; 264/511; 264/544; 264/553; 264/571; 264/46.8; 264/219; 264/220; 355/47; 40/625; 40/627; 40/800; 283/74; 283/77

(58) Field of Classification Search
USPC ................ 264/322, 132, 40.1, 511, 544, 553, 264/571, 46.8, 219, 220, 222; 355/47; 40/800, 40/625, 629; 283/74, 77
See application file for complete search history.

(56) References Cited

U.S. PATENT DOCUMENTS

| | | | |
|---|---|---|---|
| 3,796,129 A | | 3/1974 | Cruickshank |
| 5,040,005 A | * | 8/1991 | Davidson et al. ............. 396/429 |
| 5,906,005 A | * | 5/1999 | Niskala et al. ................. 2/206 |
| 5,926,388 A | | 7/1999 | Kimbrough et al. |
| 6,549,819 B1 | | 4/2003 | Danduran et al. |
| 6,568,455 B2 | | 5/2003 | Zieverink |
| 7,712,673 B2 | * | 5/2010 | Jones ............................. 235/492 |
| 2001/0028123 A1 | * | 10/2001 | Harding ....................... 264/40.1 |
| 2003/0007243 A1 | | 1/2003 | Maeda et al. |
| 2003/0030636 A1 | | 2/2003 | Yamaoka |
| 2004/0175024 A1 | | 9/2004 | Rasche et al. |
| 2005/0129281 A1 | * | 6/2005 | Ashizaki et al. ............... 283/74 |
| 2006/0188145 A1 | | 8/2006 | Song et al. |

FOREIGN PATENT DOCUMENTS

| | | |
|---|---|---|
| JP | 10074271 | 3/1998 |
| JP | 410074271 | 3/1998 |
| JP | 2003099807 | 4/2003 |

* cited by examiner

*Primary Examiner* — Timothy Kennedy
(74) *Attorney, Agent, or Firm* — Matthew Chung; Roberts Mlotkowski Safran & Cole, P.C.

(57) ABSTRACT

A method and system is provided for forming a three-dimensional image and, more particularly, for making three-dimensional digital image transfer thermoformed objects on, e.g., generic molds. The method includes manipulating digital images of a subject into a single image; printing the single image onto a media; and thermoforming the media with the single image using a generic mold. The system comprises a computer infrastructure operable to: receive images of a subject; display the images; stitch together the images to form a single image; adjust portions of the images or single image to compensate for deformation during thermoforming of the single image; register the single image with points on a mold; and print the single image.

16 Claims, 4 Drawing Sheets

METHOD AND SYSTEM OF MAKING DIGITAL IMAGE TRANSFER THERMOFORMED OBJECTS

FIELD OF THE INVENTION

The invention generally relates to a method and system of forming a three-dimensional image and, more particularly, to a method and system of making three-dimensional digital image transfer thermoformed objects on, e.g., generic molds.

BACKGROUND OF THE INVENTION

For a variety of reasons it may be desirable to produce a three-dimensional likeness of a human face. And, as technology has involved, so has the ability to produce such a three-dimensional likeness. For example, several known devices use modern equipment in order to take measurements of a human form and reproduce a solid three-dimensional object. One such technology is the use of a three-dimensional laser and moving platform in order to take a measurement of a head. Once the measurements are taken, they are processed and used to produce a three-dimensional relief of a person's head via a laser-cutting tool. However, this practice can be rather expensive, time consuming and as it measures the entire 360 degree surface of the head and reproduces a relief, not possible to make such relief in a timely manner.

In a more cost-effective process, a pointer-tool assembly has been used to reproduce a person's likeness. The pointer-tool assembly comprises a head for driving a rotary cutting tool and scanning pointer interconnected and mounted for simultaneous displacement so that each displacement of the pointer is exactly copied by the tool. This assembly further includes a projection and screen unit for showing a series of photographic records and a work table adapted to carry a block of material from which the reproduction is to be made. Again, though, this practice can be rather time consuming and, as such, not possible to make such relief in a timely manner. Also, much like the laser tool, this process makes an exact reproduction of the subject, including the shape and size of the head and facial features.

Accordingly, there exists a need in the art to overcome the deficiencies and limitations described hereinabove.

SUMMARY OF THE INVENTION

In a first aspect of the invention, a method is provided for thermoforming an image. The method includes manipulating digital images of a subject into a single image; printing the single image onto a media; and thermoforming the media with the single image using a generic mold.

In another aspect of the invention, a system for deploying an application for thermoforming an image is provided. The system comprises a computer infrastructure operable to: receive images of a subject; display the images; stitch together the images to form a single image; adjust portions of the images or single image to compensate for deformation during thermoforming of the single image; register the single image with points on a mold; and print the single image.

In still another aspect of the invention, a computer program product comprises a computer usable medium having readable program code embodied in the medium. The computer program product includes at least one component to provide the processes of the invention.

DETAILED DESCRIPTION OF EMBODIMENTS OF THE INVENTION

The invention generally relates to a method and system of forming a three-dimensional image and, more particularly, to a method and system of making three-dimensional digital image transfer thermoformed objects using generic molds. By implementing the system and method of the invention, it is now possible to efficiently manufacture a miniature scale photo-realistic three-dimensional reproduction of a subject. In accordance with the invention, the photo-realistic three-dimensional reproduction of a subject can be made in the presence of the subject, or with digital photographs provided via the Internet or other medium. Advantageously, the method of the invention takes advantage of various existing technologies that have only recently been made practical by the advent of low priced dye sublimation printing and advanced photographic manipulation software (manipulation tool).

In embodiments, different technologies such as, for example, digital photography technology, digital photographic imaging software, image modification software, image transfer technology and thermoplastic vacuum forming are implemented to make the three-dimensional thermoformed object. In embodiments, the image transfer technology is dye sublimation printing processes. As should be understood by those of skill in the art, dye sublimation printing employs a printing process that uses heat to transfer dye to a medium such as a plastic card. The image modification or manipulation software can be any off the shelf manipulation software that allows for bitmap and image manipulation. In one preferred application, the image modification or manipulation software (manipulation tool), e.g., PhotoShop® sold by Adobe® Systems Incorporated, allows for stitching together images, compressing portions of the image and other manipulations, as modified and contemplated herein.

The method and system of the invention can preferably be implemented to manufacture three-dimensional photo Identification badges, three-dimensional luggage identification, key chains, action figures, and any other applications. Many of these applications lend themselves to entertainment venues such as, for example, fairs, carnivals, theme park, and sporting event venues. However, applications go beyond that of the entertainment market, with applications in the security and advertisement fields. For example, existing identification badges can be improved by use of the three-dimensional images, in addition to other security features. As to advertisement, such use can extend into providing a display of a consumer proximate to a retail item, enticing the consumer to purchase such item.

Figure 1:
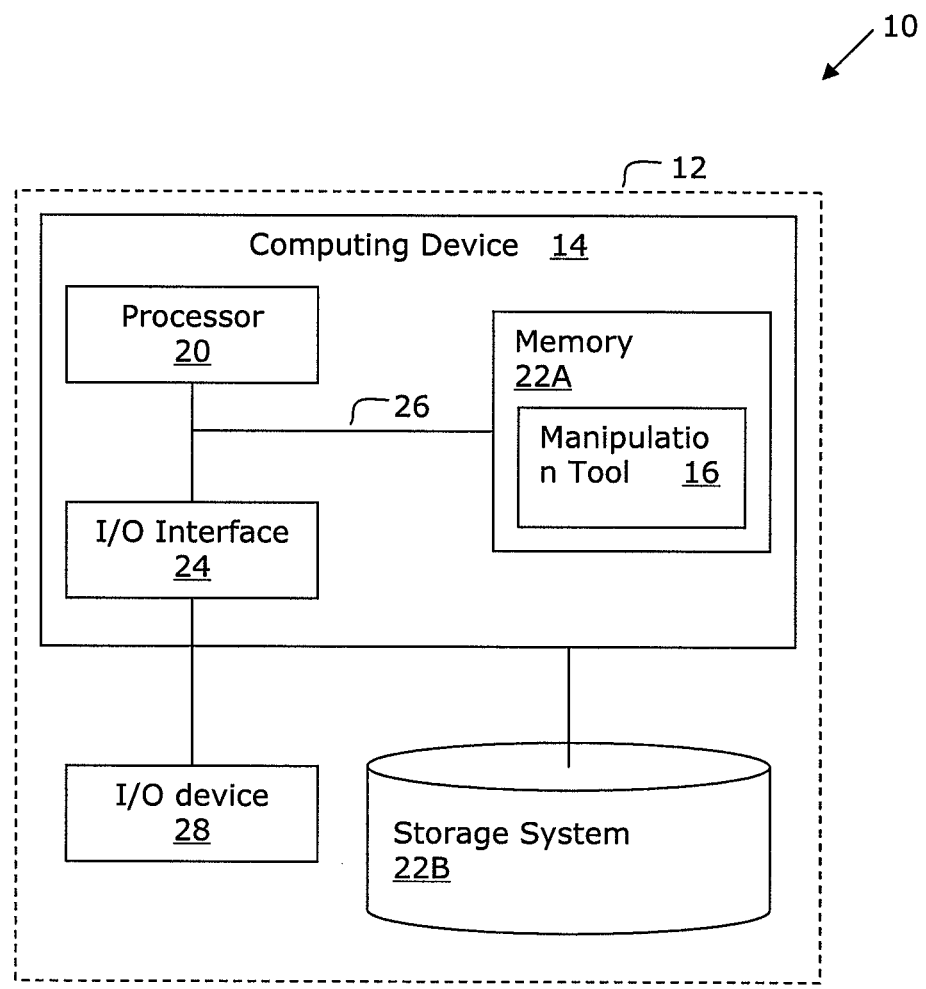
FIG. 1 shows an illustrative environment for implementing the processes in accordance with the invention.

FIG. 1 shows an illustrative environment 10 for managing the processes in accordance with the invention. To this extent, the environment 10 includes a computer infrastructure 12 that can perform the processes described herein. In particular, the computer infrastructure 12 includes a computing device 14 that is operable to manipulate a digital image such that it can be printed on a laminate for forming into a three-dimensional likeness of the subject. More specifically, the computing device 14 includes a manipulation tool 16 operable to receive a frontal image and side images of the subject, stitch together the different images and make adjustments, e.g., compress, to the images in order to print such image on a laminate. The compression is provided to the side images in order compensate for material deformation during thermoforming. That is, as adjustments are made in the two side images, the three-dimensional image can be formed in an anatomically correct manner. The amount of image compression required could be calculated using existing technology such that the calculated compression is repeatable; however, in embodiments, side images of the subject can be compressed manually. In embodiments, the compression is about 50% to 60% in order to compensate for material deformation.

The computing device 14 includes a processor 20, a memory 22A, an input/output (I/O) interface 24, and a bus 26. Further, the computing device 14 is in communication with an external I/O device/resource 28 and a storage system 22B. In embodiments, the manipulation tool 16 is stored in the memory 22A, as is shapes and registration or alignment marks of generic molds as discussed in more detail below. The bus 26 provides a communications link between each of the components in the computing device 14. The I/O device 28 can comprise any device that enables an individual to interact with the computing device 14 or any device that enables the computing device 14 to communicate with one or more other computing devices using any type of communications link. For example, the I/O device 28 can be a digital camera.

The processor 20 executes computer program, which is stored in memory 22A and/or storage system 22B. The computer program code can be associated with and running of the manipulation tool 16. While executing computer program code, the processor 20 can read and/or write data to/from memory 22A, storage system 22B, and/or I/O interface 24. The computer program code includes the processes of the invention as discussed herein.

The computing device 14 can comprise any general purpose computing article of manufacture capable of executing computer program code installed thereon (e.g., a personal computer, server, handheld device, etc.). However, it is understood that the computing device 14 is only representative of various possible equivalent-computing devices that may perform the processes described herein. To this extent, in embodiments, the functionality provided by computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computer infrastructure 12 is only illustrative of various types of computer infrastructures for implementing the invention. For example, in embodiments, the computer infrastructure 12 comprises two or more computing devices (e.g., a Client/Server) that communicate over any type of communications link, such as a network, a shared memory, or the like, to perform the process described herein. The communications link can comprise any combination of wired and/or wireless links; any combination of one or more types of networks (e.g., the Internet, a wide area network, a local area network, a virtual private network, etc.); and/or utilize any combination of transmission techniques and protocols.

A service provider can create, maintain, deploy and support the infrastructure such as that described in FIG. 1. The service provider, such as a Solution Integrator, advertiser, etc., could offer to perform the processes described herein for payment from the customer(s) under a subscription and/or fee agreement and/or the service provider can receive payment from the sale of advertising content to one or more third parties.

Figure 2:
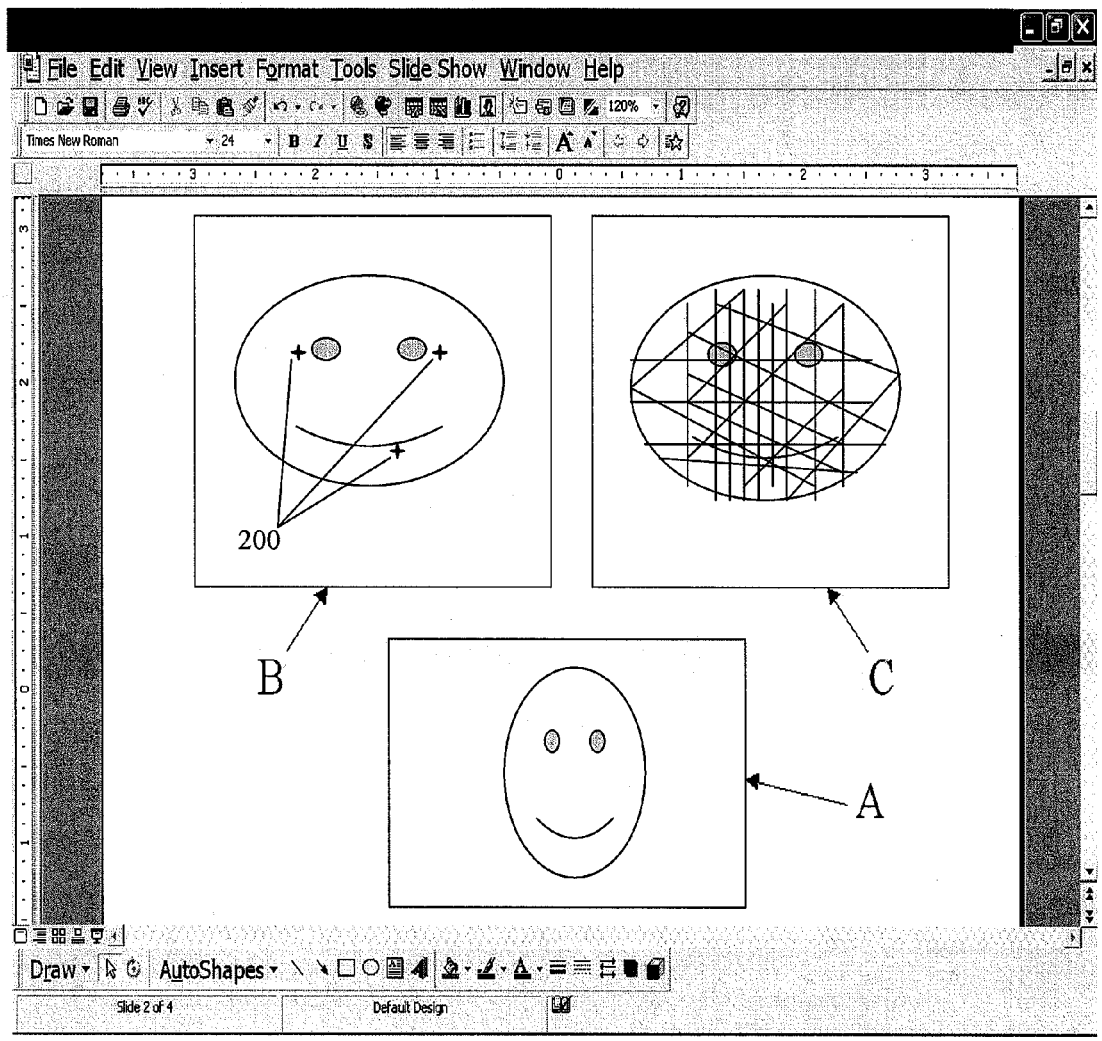
FIG. 2 show process steps of making a three-dimensional digital image in accordance with the invention.

FIG. 2 shows process steps of making a three-dimensional digital image transfer in accordance with the invention. In particular, FIG. 2 shows the manipulation tool 16 implemented in the environment of FIG. 1, for example. A photograph of a subject, represented in pane "A", is first uploaded into the software manipulation tool 16. Pane "A" is only representative of the frontal view of the subject; however, it should be understood that two side views are also uploaded into the manipulation tool 16. In embodiments, the side views are a left view and a right view of the subject, taken at an approximate 30 degree angle from the frontal view. Pane "B" is representative of the stitching process, e.g., stitching of the frontal view with the two side views. Pane "C" is representative of the compression process. More specifically, pane "C" shows graphically the compression of the side views in order to compensate for material deformation during thermoforming. It should be understood that the stitching and compression steps could be interchangeable such that the compression can be performed prior to the stitching and vice versa.

In one embodiment, the manipulation process also includes an image registration process such that, for example, the eyes, ears, nose and mouth of the subject will align with the face mold used in the thermoforming process. The registration can include marks at the appropriate positions in the image, e.g., mouth, ears, nose, etc., represented as reference numeral 200. The registration can be performed manually or by the manipulation tool 16, as discussed below.

In further embodiments, the manipulation tool 16 includes a predefined matrix of different generic mold faces. The matrix can be uploaded to the manipulation tool 16 with the digital images or stored in a storage. The matrix represents the generic face mold to be used in the thermoforming step and includes registration marks for orienting features of the images (i.e. nose, ear, eyes, mouth, etc.). In this implementation, the manipulation tool 16 is configured to automatically align the registration marks of a selected generic mold with known features of the subject face. (This can be represented as pane "C", for example.) By automatically aligning the registration marks with features of the image (or vice versa), the manipulation tool 16 also automatically and accurately compresses the side images as the registration marks of the generic mold and features of the side images (e.g., ears) are used as a template for the compression. That is, as the ears, for example, are aligned, a proper compression will automatically be realized.

Once the images are stitched together and compressed, they are printed to a laminate using, for example, dye sublimation printing. In embodiments, the image is printed onto a PVC-type media. In one preferred embodiment, the image is printed onto 10 mil PVC plastic sheets. The dye sublimation printer should preferably use a linear transport as this type of mechanism does not bend or roll the media. In one embodiment, the printing process can include the image registration process such that, for example, the eyes, ears, nose and mouth of the subject will align with the face mold used in the thermoforming process.

During the manipulation process or after the printing process, a best-fit match is made between the printed image and the face mold. In embodiments, the best-fit match is made between the manipulated image and one of several generic molds. In one preferred embodiment, the best-fit determination may be made during the manipulation process, where a generic mold matrix is already uploaded and/or stored in the manipulation tool 16 or other storage, e.g., storage 22B. It is interesting to note that the image of the subject seems to play a much larger role in visual perception than does the subtle differences in the shape of the face mold. As such, it has been found that the physical shape of the face mold contributes less to the overall realism of the subject compared of the actual visual image of the subject. With this observation, a generic mold has been found to be sufficient for purposes of implementing the invention; although customized molds can also be used with the invention.

The generic molds, in implementations, are representative of common face shapes. For example, the generic molds can be the following common face shapes: long, oval, square, round, youthful, geriatric, etc. In addition, the generic molds can be customized to include certain identifying features such as, for example, long nose, full lips, large eyes, etc. The generic molds, e.g., shapes and alignment marks for registration, can be stored in the environment of FIG. 1 such that the registration of the manipulated image and the mold can be automated, or manually manipulated. Those of skill in the art should understand that the above examples are illustrative non-limiting examples of many different face types and features. As such, the invention should not be limited to such face types and features.

Once the best-fit match is made and printing has been accomplished, the printed laminate can be molded in a conventional manner using known thermoplastic vacuum forming machines. The three-dimensional image, e.g., face, once formed, is trimmed using a die cutting tool.

Figure 3:
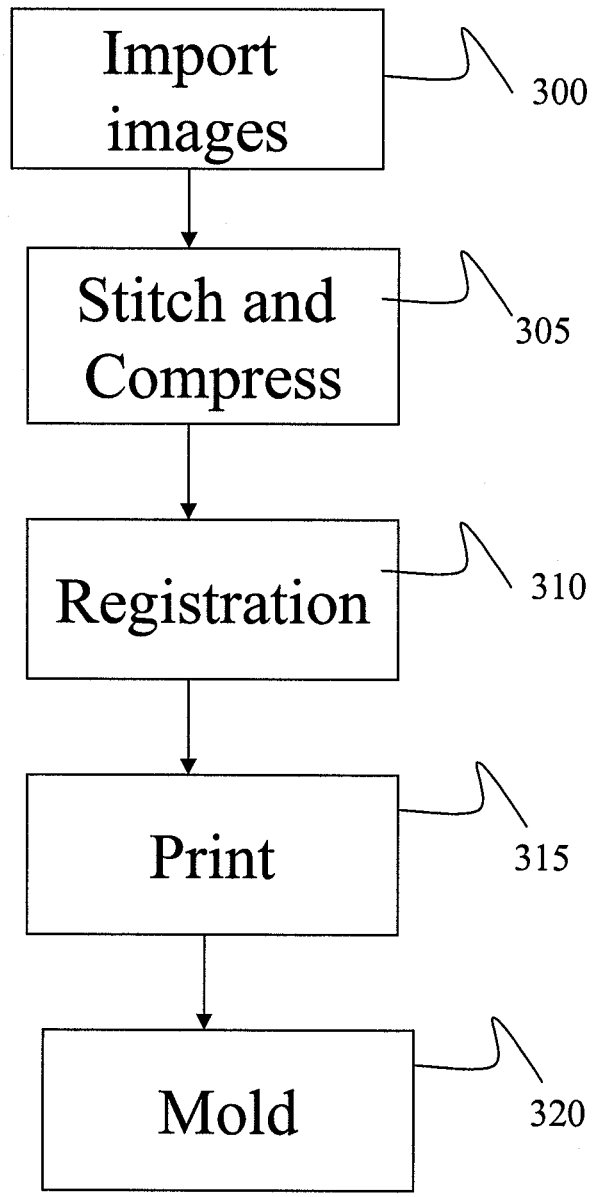
FIG. 3 shows a flow diagram implementing processes in accordance with aspects of the invention.

FIG. 3 shows a flow diagram implementing processes in accordance with aspects of the invention. FIG. 3 equally represents a high-level block diagram of the invention. Additionally, the invention can take the form of an entirely hardware embodiment, an entirely software embodiment or an embodiment containing both hardware and software elements. In an embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-RAN) and DVD.

Referring to FIG. 3, at step 300, a frontal view and two side images are imported or uploaded into the manipulation tool. At step 305, the images are stitched together and compressed according to the geometry of the mold. At step 310, the manipulated image is registered with points associated with the mold. In embodiments, the registration may be provided using a mold matrix, stored in the manipulation tool or other storage in accordance with the invention. At step 315, the manipulated image is printed using, for example, dye sublimation. At step 320, the printed image is thermoformed and trimmed using a die cutting tool.

Figure 4:
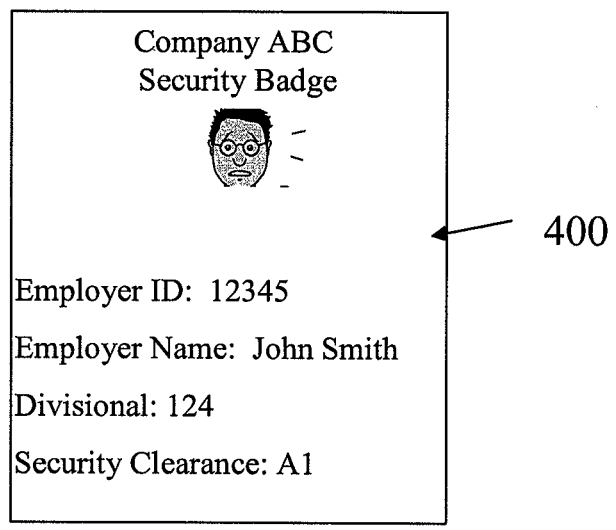
FIGS. 4-5 show various implementations of the invention.
Figure 5:

FIGS. 4-5 show various implementations of the invention. FIG. 4 shows the invention being implemented in an identification badge 400. As noted above, the three-dimensional image of the subject on an identification badge can be used to improve security measures. The identification badge 400 can include other security features such as, for example, name of subject, identification number, security clearance, etc. FIG. 5 shows the invention implemented for entertainment or advertisement purposes. That is, the mold is superimposed onto a body clothed with garment for purchase in a retail environment.

Additional realism could be attained by transferring detailed physical characteristics (i.e. nose shape, eye position, cleft chin, etc.) to the mold. A "pin sculpture" device could be used to capture the details of the facial features. These features could then be translated to scale and then used as the mold for the thermoformed object.

While the invention has been described in terms of embodiments, those skilled in the art will recognize that the invention can be practiced with modifications and in the spirit and scope of the appended claims.

What is claimed is:

1. A method, comprising:
    manipulating digital images of a subject into a single image;
    printing the single image onto a media;
    thermoforming the media with the single image using a generic mold; and
    manufacturing an identification badge of the subject including the thermoformed media,
    wherein the thermoformed media is a miniature scale reproduction of the subject.

2. The method of claim 1, wherein the manipulating includes stitching together a frontal view and side views of the subject.

3. The method of claim 2, wherein the side views are two side views at an angle of approximately 30 degrees from the frontal view.

4. The method of claim 2, wherein the manipulating further includes compressing the side views to compensate for molding distortion.

5. The method of claim 4, wherein the compression is about 50% to 60% of an original size.

6. The method of claim 1, further comprising registering points of the single image with points on the generic mold.

7. The method of claim 1, further comprising storing a matrix of the generic mold.

8. The method of claim 7, wherein the matrix includes registration marks for orienting features of the single image.

9. The method of claim 1, wherein the generic mold includes customized features.

10. The method of claim 1, further comprising providing a computer infrastructure implementing the steps of claim 1 and which is at least one of created, deployed, maintained and supported by service provider.

11. The method of claim 1, wherein the generic mold is a face mold.

12. The method of claim 11, wherein the face mold is selected from a predefined matrix of different generic face molds representing a plurality of face shapes.

13. The method of claim 12, wherein the face shapes include long, oval, square, round, youthful, and geriatric.

14. The method of claim 11, wherein:
    the face mold includes eyes, ears, a nose, and a mouth, and
    the manipulating the digital images comprises registering the single image with the eyes, the ears, the nose, and the mouth of the face mold.

15. The method of claim 1, wherein the thermoforming the media with the single image using the generic mold comprises selecting the generic mold by determining a best fit match between the single image and one of a plurality of different, predefined generic molds.

16. A method, comprising:
- stitching together digital images of a frontal view and side views of a subject into a single image of a face of the subject;
- registering the single image of the face of the subject with eyes, ears, nose, and mouth of a selected one of a plurality of generic face molds;
- printing the single image of the face of the subject onto a media;
- thermoforming the media with the single image of the face of the subject using the selected one of the plurality of generic face molds; and
- manufacturing an identification badge of the subject including the thermoformed media,
- wherein the thermoformed media is a miniature scale reproduction of the subject.

\* \* \* \* \*